United States Patent
Stolpe et al.

(10) Patent No.: US 9,833,010 B2
(45) Date of Patent: Dec. 5, 2017

(54) UNIT FOR DOSING A CONFECTIONERY MASS INCLUDING A REVERSING ROTARY PISTON

(71) Applicant: Sollich KG, Bad Salzuflen (DE)

(72) Inventors: Kersten Stolpe, Bad Salzuflen (DE); Nico Sewing, Werther (DE)

(73) Assignee: SOLLICH KG, Bad Salzuflen (DE)

( * ) Notice: Subject to any disclaimer, the term of this patent is extended or adjusted under 35 U.S.C. 154(b) by 256 days.

(21) Appl. No.: 14/702,082

(22) Filed: May 1, 2015

(65) Prior Publication Data

US 2015/0313252 A1    Nov. 5, 2015

(30) Foreign Application Priority Data

May 5, 2014   (EP) ..................................... 14166963

(51) Int. Cl.
*A23G 1/04*   (2006.01)
*A23G 3/20*   (2006.01)
(Continued)

(52) U.S. Cl.
CPC ............. *A23G 1/045* (2013.01); *A23G 1/206* (2013.01); *A23G 3/021* (2013.01); *A23G 3/0257* (2013.01);
(Continued)

(58) Field of Classification Search
CPC ........ A23G 1/045; A23G 1/206; A23G 3/021; A23G 3/0257; A23G 3/203; A23G 1/0013; A23G 3/0008; B65B 3/36; B65B 37/16; B65B 37/20; G01F 11/20; G01F 11/22

USPC ................ 417/415, 521; 426/317, 315, 660; 425/206, 256, 163; 222/252, 354–355, 222/367–368; 141/137, 242
See application file for complete search history.

(56) References Cited

U.S. PATENT DOCUMENTS 1,533,597 A  *  4/1925  Hislop .................. A23G 1/206
                                                      222/362
1,553,597 A  *  9/1925  Clark ........................ B60P 1/36
                                                      414/505
(Continued)

FOREIGN PATENT DOCUMENTS

DE         34 10 302 A      3/1984
DE     10 2005 004 785 A1   1/2005
(Continued)

*Primary Examiner* — Paul R Durand
*Assistant Examiner* — Andrew P Bainbridge
(74) *Attorney, Agent, or Firm* — Thomas | Horstemeyer, LLP (57) ABSTRACT

A unit (1) for dosing a confectionery mass includes a base body (2), a dosing chamber (26) for containing a confectionery mass and a rotary piston (3) being reversingly driven to alternatingly fill the dosing chamber (26) with confectionery mass and to remove confectionery mass from the dosing chamber (26). The rotary piston (3) has a filling cycle for filling the dosing chamber (26) with confectionery mass during which it is rotatingly driven in a first direction of rotation (28). The rotary piston (3) has a removing cycle for removing the confectionery mass from the dosing chamber (26) during which it is rotatingly driven in a second direction of rotation (29) being opposite to the first direction of rotation (28). The filling cycle and the removing cycle form one complete working cycle.

16 Claims, 11 Drawing Sheets

(51) Int. Cl.
*A23G 1/20* (2006.01)
*A23G 3/02* (2006.01)
*G01F 11/20* (2006.01)
*A23G 3/34* (2006.01)
*G01F 11/22* (2006.01)
*B65B 37/16* (2006.01)
*B65B 3/36* (2006.01)
*B65B 37/20* (2006.01)
*A23G 1/00* (2006.01)

(52) U.S. Cl.
CPC ............ *A23G 3/203* (2013.01); *A23G 1/0013* (2013.01); *A23G 3/0008* (2013.01); *B65B 3/36* (2013.01); *B65B 37/16* (2013.01); *B65B 37/20* (2013.01); *G01F 11/20* (2013.01); *G01F 11/22* (2013.01)

(56) References Cited

U.S. PATENT DOCUMENTS

| | | | | |
|---|---|---|---|---|
| 1,934,391 | A * | 11/1933 | Vierow | A23G 3/0257 425/377 |
| 4,538,978 | A * | 9/1985 | Cerboni | A23G 1/045 222/271 |
| 4,546,005 | A * | 10/1985 | Vongeheur | A23G 3/0226 426/512 |
| 4,588,599 | A * | 5/1986 | Cerboni | A23G 1/206 425/218 |
| 5,534,283 | A * | 7/1996 | Cerboni | A23G 1/205 426/515 |
| 7,237,699 | B2 * | 7/2007 | Zill | B65B 1/16 222/189.06 |
| 7,618,251 | B2 | 11/2009 | Steiner et al. | |
| 8,915,406 | B2 * | 12/2014 | Hu | A47J 31/404 222/1 |
| 8,974,202 | B2 * | 3/2015 | Gasser | A23G 1/0066 222/361 |
| 2014/0239019 | A1 * | 8/2014 | Altjohann | A23G 1/045 222/394 |

FOREIGN PATENT DOCUMENTS

| | | |
|---|---|---|
| DE | 10 2005 018 503 A1 | 4/2005 |
| EP | 0 122 369 A2 | 4/1983 |
| WO | 91/18518 A1 | 12/1991 |

* cited by examiner

UNIT FOR DOSING A CONFECTIONERY MASS INCLUDING A REVERSING ROTARY PISTON

CROSS REFERENCE TO RELATED APPLICATIONS

This application claims priority to co-pending European Patent Application No. EP 14 166 963.0 entitled "Süß warenmassendosiereinheit mit einem reversierend drehend angetriebenen Drehkolben", filed May 5, 2014.

FIELD OF THE INVENTION

The present invention generally relates to a unit for dosing a confectionery mass, an apparatus for dosing a confectionery mass including a plurality of units for dosing a confectionery mass and a method of dosing a confectionery mass.

Units for dosing a confectionery mass serve to release a defined mass and a defined volume, respectively, of a confectionery mass from a reservoir of confectionery mass during the production of sweets. The confectionery mass is especially a mass including fat and/or sugar and/or sugar substitutes. Examples are caramel, fondant, chocolate mass, icings, glazings and so forth. The dosed portion of confectionery mass then especially constitutes the final confectionery product, a filling of the final confectionery product or a topping of the final confectionery product.

To allow for simultaneous dosing of a plurality of portions of the confectionery mass, the apparatus includes a plurality of such units for dosing a confectionery mass. It is especially possible to move the apparatus with respect to a conveyor belt in a clocked manner to be capable of conducting the dosing process with an automated manufacturing process.

BACKGROUND OF THE INVENTION

An apparatus for dosing a confectionery mass including a plurality of units for dosing a confectionery mass is known from European patent application No. EP 0 122 369 A2 corresponding to U.S. Pat. No. 4,538,978, Each one of the units for dosing a confectionery mass includes a rotary piston for alternatingly filling a dosing chamber with confectionery mass and removing the confectionery mass from the dosing chamber. For this purpose, the rotary piston is driven with respect to a base body in a rotational direction f. During its repeated rotation about 360°, the rotary piston can be stopped in two positions, namely at 12 o'clock and at approximately 8 o'clock.

The unit for dosing a confectionery mass includes an outlet valve which together with the rotary piston and a part of the base body forms a dosing chamber for containing the confectionery mass. In the opened position of the outlet valve, the rotation of the rotary piston in the rotational direction f leads to removing the confectionery mass from the dosing chamber through the opened outlet valve and through an outlet opening. In the closed position of the outlet valve, the continued rotational movement of the rotary piston in the rotational direction f then leads to confectionery mass from the mass supply being sucked into the dosing chamber.

The units for dosing a confectionery mass are located one after the other in the apparatus such that their rotary pistons have a common rotational axis.

An apparatus for pouring chocolate is known from international patent application WO 91/18518 A1. The apparatus includes a rotary piston which is driven in a reversing manner. The rotary piston is designed and arranged to simultaneously fill a first dosing chamber with chocolate and to remove chocolate from a second dosing chamber. The rotary piston thus has a combined filling and removing cycle. In addition to this first combined filling and removing cycle, a full working cycle of the apparatus includes an idle cycle. During this idle cycle, the entire dosing unit is rotated about 180° into a second position. Once the second position has been reached, a second combined filling and removing cycle takes place in which the rotary piston is now rotatingly driven in an opposite second direction of rotation. The rotary piston is designed as an elongated shaft substantially extending over the entire length of the apparatus. The apparatus thus only includes one rotary piston and only one dosing chamber.

An apparatus for dosing a confectionery mass is known from German patent application No. DE 10 2005 018 503 A1 corresponding to U.S. Pat. No. 8,974,202. The apparatus includes a plurality of units for dosing a confectionery mass being located side by side. Each of the units for dosing a confectionery mass includes a rotary piston including an opening. The rotary piston is designed and driven to rotate in a reversing way and to move back and forth in a translational way.

SUMMARY OF THE INVENTION

The present invention relates to a unit for dosing a confectionery mass including a reversingly driven rotary piston to alternatingly fill a dosing chamber with confectionery mass and to remove confectionery mass from the dosing chamber.

With the novel unit for dosing a confectionery mass, the novel apparatus including a plurality of units for dosing a confectionery mass and the method of dosing a confectionery mass with such an apparatus, it is possible to dose a confectionery mass portions of the mass in accurate weight as well as fast and gently.

According to the invention, the rotation of the rotary piston in only one rotational direction as described above with reference to the prior art document EP 0 122 369 A2 about 360° during one working cycle is replaced by an alternating rotation of the rotary piston in two opposite rotational directions. The first rotational direction is functionally associated with the act of filling the dosing chamber with confectionery mass. The opposite second rotational direction is functionally associated with the act of removing the confectionery mass from the dosing chamber. Due to these two different rotational directions of the rotary piston, it is possible to rotate the rotary piston during a complete working cycle including a filling cycle and a removing cycle by less than 360°. In this way, compared to the prior art, one attains a shorter cycle time and thus a greater throughput of the unit for dosing a confectionery mass. The pivotal movement during filling of the dosing chamber with confectionery mass and the pivotal movement during removing confectionery mass from the dosing chamber may each be less than 180°, especially less than 90° and preferably less than 45°.

The filling cycle and the removing cycle thus form one complete working cycle. Especially, there is no time buffer between these two cycles. During these cycles, the rotary piston either stands still or is driven to move in opposite rotational directions. The cycles can also overlap.

The unit for dosing a confectionery mass my include a base body, the rotary piston being rotatingly driven with respect to the base body. The base body of the unit for dosing a confectionery mass could also be designated as a housing and the like. It serves to contain e.g. the rotary piston, the dosing chamber and the confectionery mass. The unit for dosing a confectionery mass further includes an outlet valve including a dosing part being rotatingly driven with respect to the base body and the rotary piston to alternatingly reach a closed position and an opened position. The dosing chamber is limited and defined, respectively, by the base body, the rotary piston and the closing part. The unit for dosing a confectionery mass my further include an outlet opening for discharging the confectionery mass from the dosing unit. The outlet opening in the closed position of the closing part is not connected to the dosing chamber. The outlet opening in the opened position of the closing part is connected to the dosing chamber.

The maximum volume of the portion of the mass that can be dosed with the unit for dosing a confectionery mass is defined by the design and relative arrangement of the base body, the rotary piston and the closing part. A smaller volume of the dosing chamber is especially attainable by adjusting the two reversal points of the rotary piston during its reversing rotational movement. In this way, the unit for dosing a confectionery mass can be adjusted in a flexible and exact way to dose different volumes of portions of confectionery mass smaller than the maximum volume of the portion.

Confectionery mass is continuously provided to the dosing chamber via a mass supply such that the dosing chamber is re-filled with confectionery mass after confectionery mass has been removed therefrom. The mass supply is especially separated from the surroundings as far as pressure is concerned, and it is subjected to positive pressure. The positive pressure may be especially approximately 1 bar and preferably approximately 3 bar or more. In this way, the mass supply supplies the dosing chamber with confectionery mass in a reliable and quick way. This results in the advantage that it is possible to handle the reservoir of confectionery mass separate from the unit for dosing a confectionery mass. In this way, it is especially possible to commonly move the unit for dosing a confectionery mass with a conveyor belt to deliver confectionery mass in a defined way and to store the reservoir of confectionery mass in a stationary way.

However, it is also possible to connect the mass supply to the atmosphere and to feed the confectionery mass through a funnel, for example. In this case, feeding takes place under the influence of gravity. This is especially appropriate in case of masses which cannot be pumped and which are not pressure resistant.

The rotary piston and the dosing part may be designed and arranged such that the dosing chamber and the outlet opening are not connected to the mass supply in the opened position of the closing part and also during the beginning of the rotational movement of the closing part from the closed position into the opened position. Especially if the confectionery mass is subjected to pressure, one would otherwise have the problem that confectionery mass already exits through the outlet opening before the rotary piston fulfills its removing movement. For example, this could lead to confectionery mass being dispensed at a wrong location or too much confectionery mass being dispensed at the correct location.

The closing part may include a sealing member for separating the dosing chamber and the outlet opening from the mass supply. The sealing member may be formed by a surface of the closing part having the shape of a part of a circular arc as seen in cross section. The part of the circular arc is chosen such that the sealing function is maintained during the entire opening movement of the closing part of the outlet valve. This is especially realized by the part of the circular arc extending over a greater angle portion than the angle difference occurring during the opening movement of the closing part between the just opened position and the end of this opening movement.

The outlet valve may be especially designed such that the outlet channel is partly designed to be circumferentially opened. In contrast to a complete circumferentially closed outlet channel, there is a reduced danger of confectionery mass collecting in the outlet channel.

The base body may include a sealing member for limiting the dosing chamber and for sealing the dosing chamber with respect to the mass supply. The sealing member defines a sealing portion. The rotary piston may include a corresponding sealing member for sealing the dosing chamber with respect to the mass supply. During the normal operation of the unit for dosing a confectionery mass, the rotary piston may only be moved within the sealing portion of the base body, i.e. it does not leave this portion. The working cycles are to be understood as the normal operation. Due to the rotational movement of the rotary piston, it is understood that the sealing portion has the shape of a part of a circular arc. Thereafter, the base body can either end or further extend in a different form. If the rotary piston was passing this position—as this is the case in the prior art reference EP 0 122 369 A2—there would be shearing of the confectionery mass which can result in the confectionery mass being damaged. Since shearing edges and/or negative pressure are prevented, aerated masses or masses including cereals can be dosed without damages occurring and with reduced damages, respectively.

There may be a cleaning position of the rotary piston and of the outlet valve outside of the normal operation, the cleaning position allowing for a cleaning trip. The cleaning trip serves to prevent a buildup of confectionery mass in the apparatus. For example, a cleaning trip may take place during a stop of the apparatus during the day, for example for changing the mass, or at night.

During the removing cycle, the rotary piston can be rotatingly driven in the second rotational direction at two different rotational velocities. The greater the rotational velocity of the rotary piston, the greater the discharged volume flow of confectionery mass. By different rotational velocities, different volume flows can be produced at different points in time during the removing cycle. If then one or more relative movements of the unit for dosing a confectionery mass with respect to the conveyor means is attained, different geometric shapes can be produced. For example, in this way it is possible to fill a rhombic opening of a confectionery item.

The rotary piston can be driven such that it fulfills a short movement backwards in an opposite direction at the end of the removing cycle. In this way, a defined thread breakage of the confectionery mass can be realized. Such a defined thread breakage especially makes sense and is required, respectively, for sticky masses.

The rotary piston can be driven by a servomotor. With such a servomotor, the required reversing rotational movement can be realized in an exact way. The reversing points of the rotational movement, the standstill times, the angle of rotation and the rotational velocity can be adjusted in an exact way.

Such a servomotor may also be used for the separate drive of the closing part of the outlet valve. In this case, there are two drives each including one servomotor.

The present invention also relates to an apparatus for dosing a confectionery mass including a plurality of units for dosing a confectionery mass being located side by side. The units for dosing a confectionery mass may include the above described features. With such an apparatus, it is possible to simultaneously dose a plurality of portions of confectionery mass in an automated manufacturing process. The arrangement of the units for dosing a confectionery mass side by side and not one after the other—as this is the case in the prior art reference EP 0 122 369 A2—results in the advantage of the manufacturing tolerances and especially the length variation not summing up. The apparatus for dosing a confectionery mass may especially include 4, 5, 10, 12, 15, 17, 18, 20, 25, 30, 35 or more units for dosing a confectionery mass being located side by side.

The novel unit and apparatus for dosing a confectionery mass serve to dose, e.g. to deposit, a confectionery mass including fat and/or sugar and/or sugar substitutes. For example, the confectionery mass may be caramel, fondant, chocolate mass, fat icing, fat glazing, jelly, fruit mass, nougat, cookie filling, jam, aerated masses, cream, marshmallows or egg white foam.

With the novel apparatus, a great number of cycles per time unit can be realized. In this way, cycle numbers of more than 50 cycles per minute and especially of approximately 75 or more cycles per minute are possible.

In the apparatus including plurality of units for dosing a confectionery mass, the rotary pistons of the units for dosing a confectionery mass are preferably driven by a common first drive including a first servomotor. The closing parts of the outlet valves of the units for dosing a confectionery mass are also driven by a common second drive including a second servomotor. However, it is also possible to use other drives and motors to realize the desired adjustment of the rotational movement.

The apparatus is especially operated such that the confectionery mass continuously flows through the apparatus. In this way, it is ensured that the mass supply and thus also the dosing chambers are permanently supplied with confectionery mass. Dosing of the confectionery mass can thus be realized in an exact volumetric way.

The apparatus may include at least one flexible hose conduit through which the confectionery mass is fed to the units for dosing a confectionery mass and the mass supply or the mass supplies, respectively. In this way, the reservoir of confectionery mass serving to supply the mass supply can be arranged outside of the apparatus. Thus, there is the advantage of the apparatus being designed to be comparatively small and light such that it can be moved quickly. In contrast thereto, the reservoir can be arranged to be stationary such that there is a relative movement between the moving apparatus and the stationary reservoir. This relative movement is compensated by the flexible hose conduit and the flexible hose conduits, respectively.

The apparatus may include a plurality of such flexible hose conduits for feedings the confectionery mass. For example, there may be two such hose conduits for feeding and one hose conduit for discharging the surplus confectionery mass. The first hose conduit for feeding may be arranged approximately in the region of the first unit for feeding a confectionery mass in the series of units for feeding a confectionery mass and the second hose conduit can be arranged approximately in the region of the last unit for feeding a confectionery mass in the series of units for dosing a confectionery mass. The discharging conduit is preferably arranged approximately in the middle portion of the series. In this way, permanent supply of the mass supply with confectionery mass is ensured. At the same time, it is ensured that the apparatus can be moved with respect to the surroundings in a flexible, simple and quick way.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Referring now in greater detail to the drawings, FIGS. 1 to 8 illustrate different operational positions of a first exemplary embodiment of the novel unit 1 for dosing a confectionery mass.

The unit 1 for dosing a confectionery mass includes a base body 2 which could also be designated as a housing. The base body 2 is only partly illustrated in the views of FIGS. 1 to 8. The top most line, the left most line and the right most line are not part of the base body 2, but they instead indicate that the illustration ends there. The complete design of the base body 2 is to be seen in FIGS. 9 and 10.

A rotary piston 3 is arranged in the base body 2, and it is rotatingly driven with respect to the base body 2 about a rotational axis 4. The rotary piston 3 at its one end 5 includes a surface 38 having the shape of a part of a circular arc as seen in cross section and a sealing member 6 being formed by this surface 38. In this illustrated example, the sealing member 6 is the surface of the rotary piston 5. However, it could also be a different sealing member, for example a separate elastic sealing member being made of rubber, the sealing member being connected to the rotary piston 3. The rotary piston 3 in a different region includes another sealing member 7.

The unit 1 for dosing a confectionery mass further includes an outlet valve 8 including a closing part 10 being rotatingly driven about a rotational axis 9. The closing part 10 includes a plurality of surfaces 11, 12 and 13 having the shape of a part of a circular arc as seen in cross section as well as a plain surface 14. The surface 11 forms a sealing member 15.

An outlet opening 16 is arranged in the lower portion of the base body 2. An outlet nozzle 17 is connected to the outlet opening 16.

The base body 2 in its upper region include a free space 18 and there below two free spaces 19 and 20 each having partly the shape of a circle as seen in cross section.

The free space 19 is formed by a surface 21 and a surface 22 being located at the other side of the rotary piston 3. The surface 21 has the shape of a part of a circular arc as seen in cross section. The surface 22 also has the shape of a part of a circular arc as seen in cross section. The surface 21 forms a sealing member 24. The sealing member 24 defines a sealing portion 27.

The free space 20 is formed by a surface 37 and an opposite surface 23. The surface 37 has the shape of a part of a circular arc as seen in cross section. The surface 23 has the shape of a part of a circular arc as seen in cross section.

During normal operation of the unit 1 for dosing a confectionery mass, all free spaces 18, 19, 20 as well as the outlet opening 16 and the outlet nozzle 17 are completely filled with confectionery mass. The confectionery mass is not illustrated in the drawings. However, one can also understand the drawings such that all non-cross hatched portions in the interior of the base body 2 contain confectionery mass.

Figure 1:
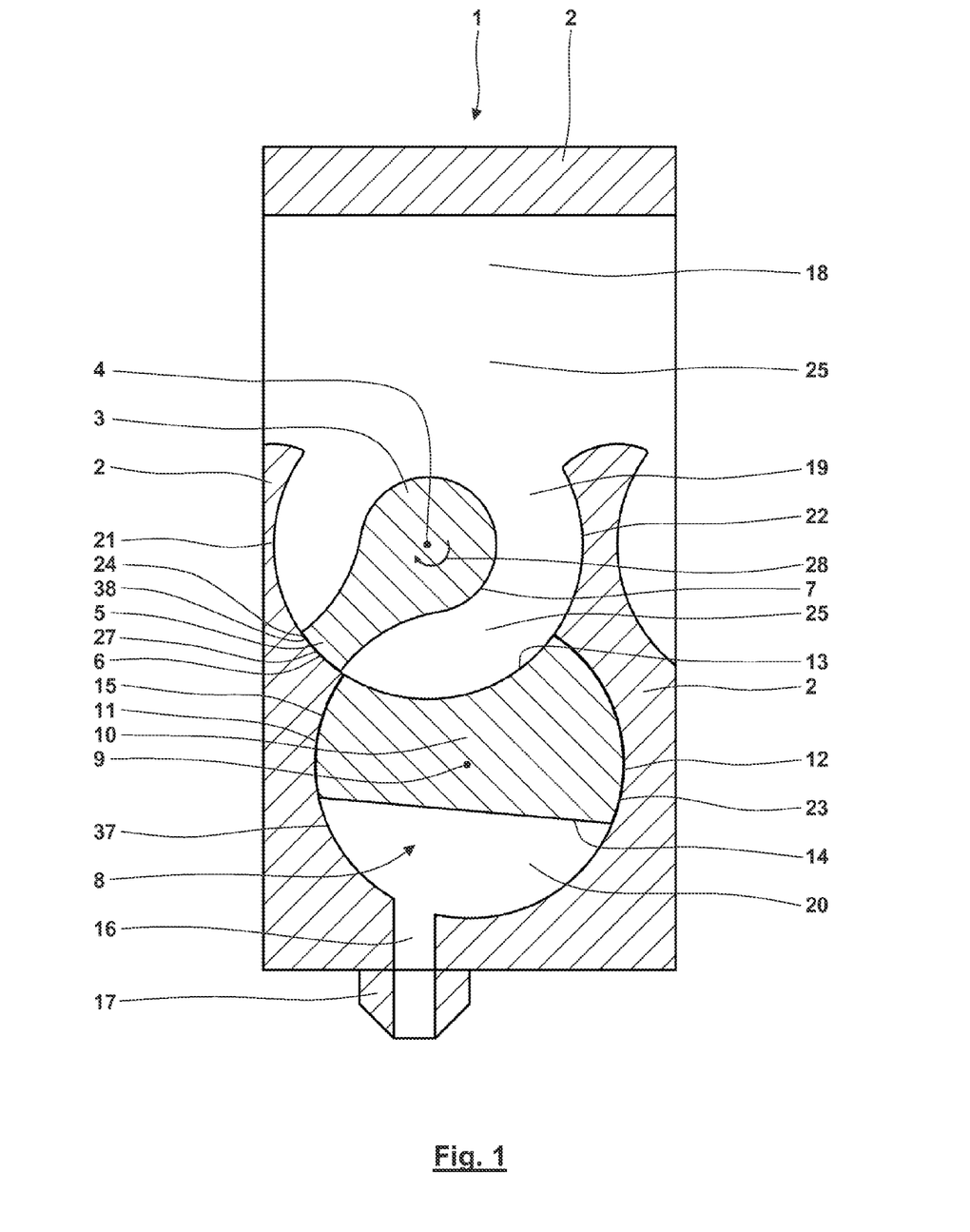
FIG. 1 is a sectional view of a first exemplary embodiment of the novel unit for dosing a confectionery mass in a first position at the beginning of a filling cycle.

The part of the confectionery mass which, for example, fills the free spaces 18 and 19 in FIG. 1 is the so called mass supply 25.

Figure 3:
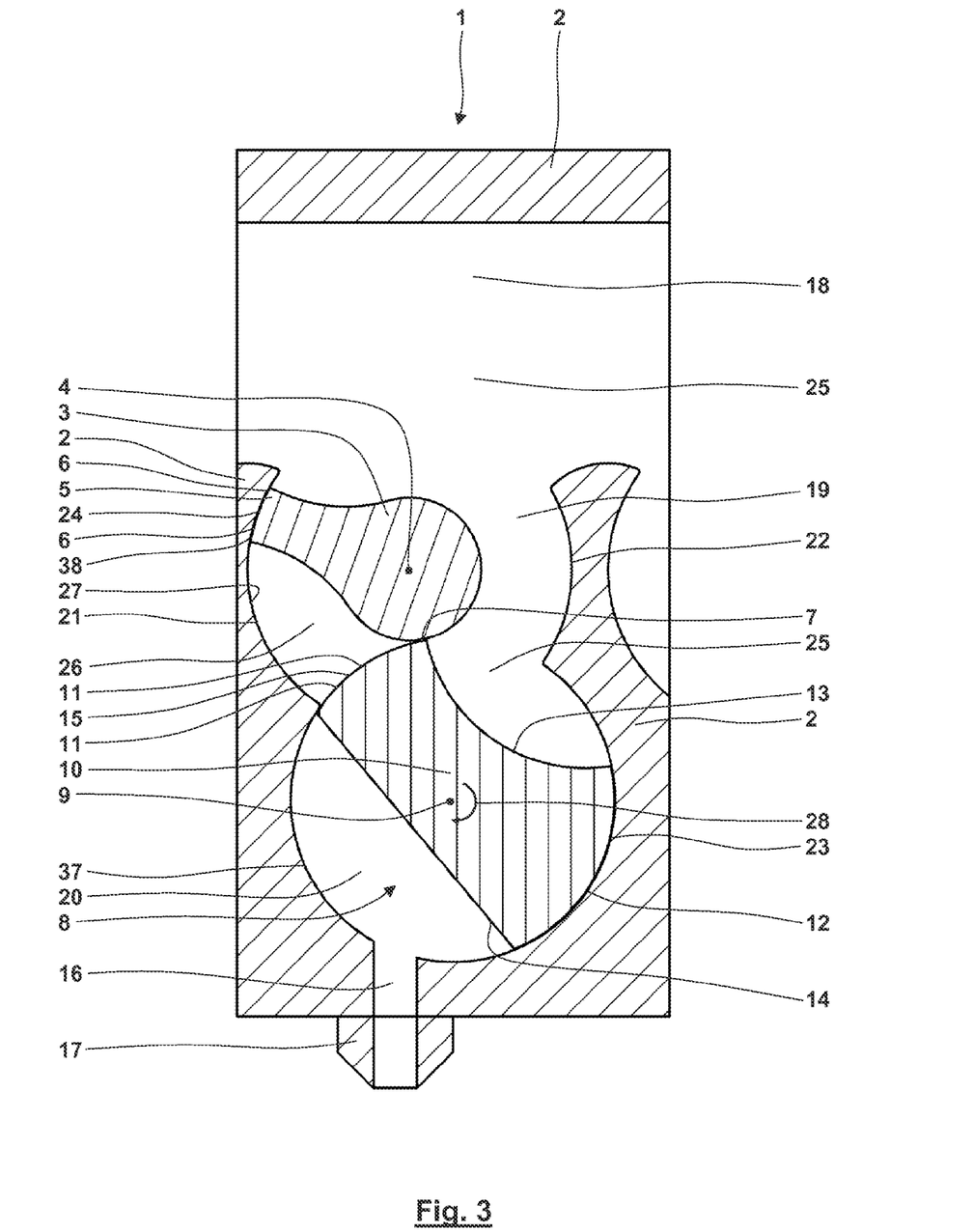
FIG. 3 is a view of the unit for dosing a confectionery mass in a following third position.

The part of the free space 19 serving to determine the volume of the portion of the confectionery mass is designated as dosing chamber 26 (see FIG. 3, for example). The mass supply 25 and the dosing chamber 26 do not have a permanent shape, but they change and they result, respectively, due to the different positions of the rotary piston 3 and the closing part 10 during operation of the unit 1 for dosing a confectionery mass.

In the following, the functionality of the unit 1 for dosing a confectionery mass is explained in greater detail with reference to FIGS. 1 to 8:

FIG. 1 illustrates the unit 1 for dosing a confectionery mass in a first position at the beginning of a filling cycle of the unit 1 for dosing a confectionery mass. The rotary piston 3 is located in its lower most position with respect to the sealing portion 27 of the base body 2. The sealing effect can be attained due to an exact manufacture of the corresponding surfaces 24 and 38 and a correspondingly small gap. However, it can also be realized in a different way.

The closing part 10 and thus the outlet valve 8 is located in its closed position.

Figure 2:
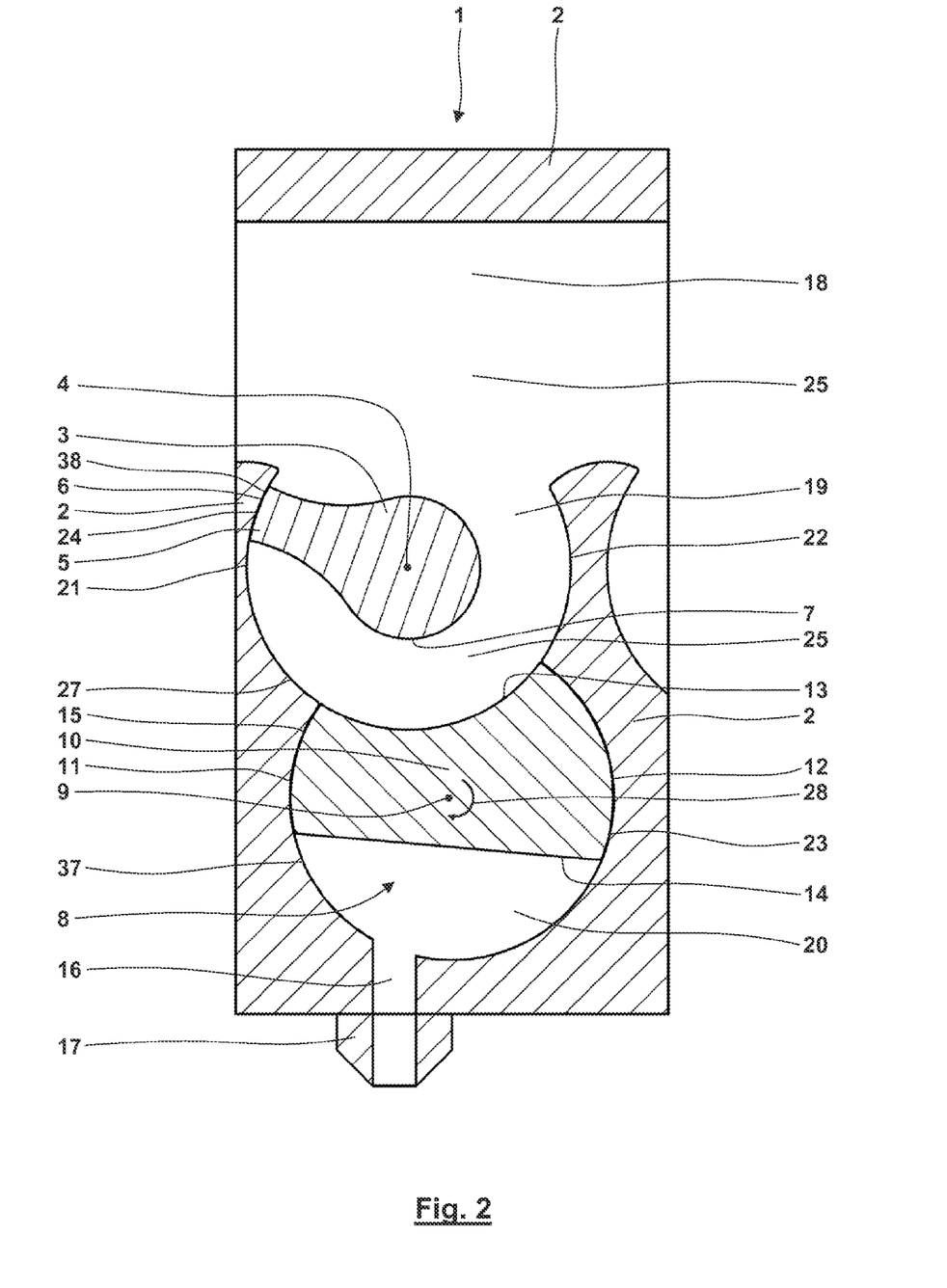
FIG. 2 is a view of the unit for dosing a confectionery mass in a following second position.

The rotary piston 3 is now rotated from the first position illustrated in FIG. 1 into the second position illustrated in FIG. 2. The rotary piston 3 is rotatingly driven about the rotational axis 4 in a first direction of rotation 28. This direction of rotation 28 in this case corresponds to the clockwise direction. The rotary piston 3 reaches the position illustrated in FIG. 2, and it initially remains in this position. This means that it does not move. The part of the free space 19 later forming the dosing chamber 26 is filled with confectionery mass.

Next, the closing part 10 is actuated as this is continuously illustrated in FIGS. 3, 4, 5 and 6. The closing part 10 is also rotatingly driven in the first direction of rotation 28. The outlet valve 8 could however be also constructed such that this direction of rotation does not correspond to the first direction of rotation 28 of the rotary piston 3. It would also be possible that this rotational movement is executed completely or partly at the same time as the above described rotational movement of the rotary piston 3.

FIG. 3 illustrates a third position of the unit 1 for dosing a confectionery mass. In this position, the outlet opening 16 is closed and the sealing effect between the closing part 10 and the rotary piston 3 is active. The rotary piston 3 also seals with respect to the base body 2. In this way, a closed chamber having a defined volume is formed by these components, the chamber being the dosing chamber 26.

Figure 4:
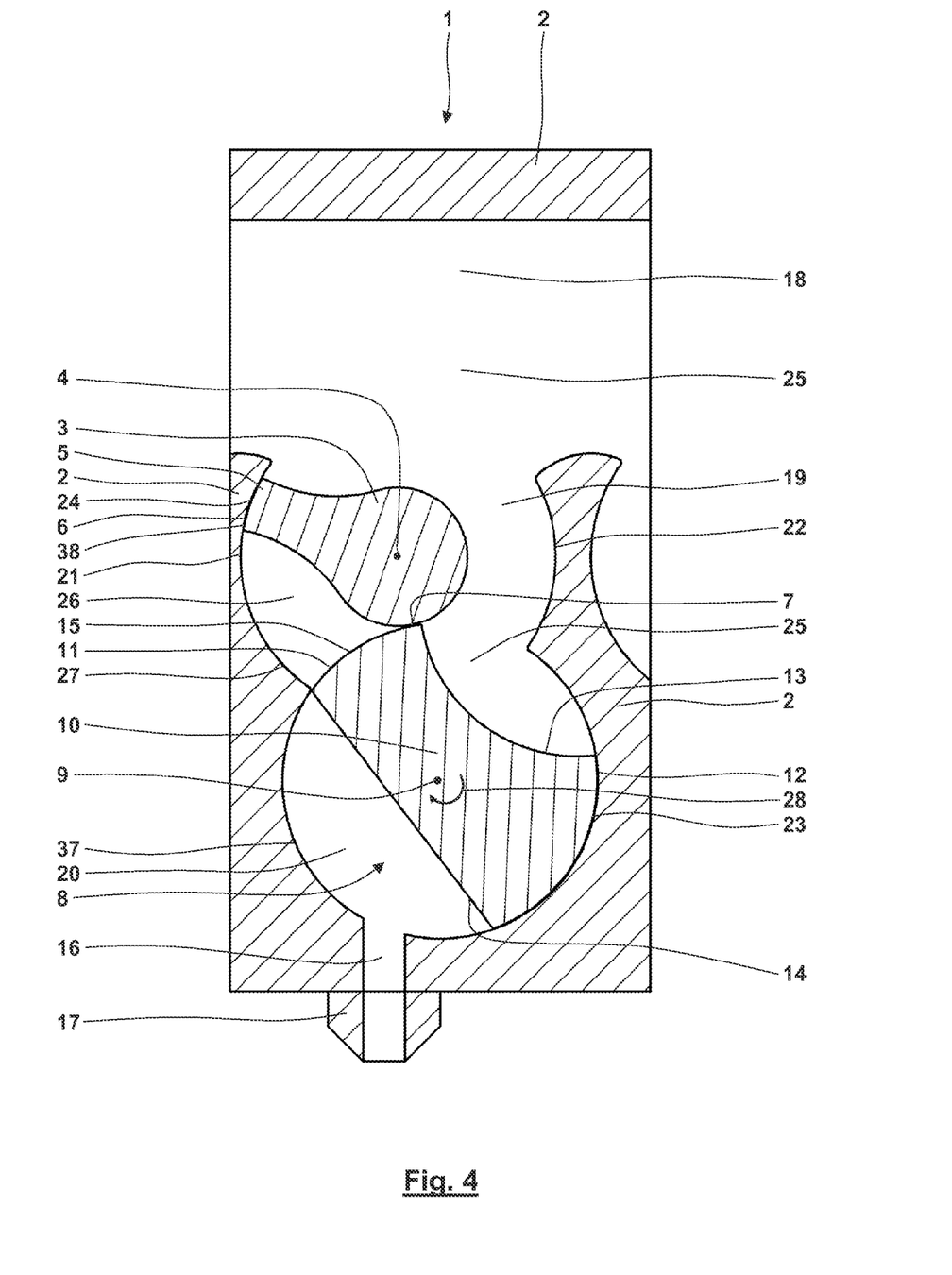
FIG. 4 is a view of the unit for dosing a confectionery mass in a following fourth position.

FIG. 4 illustrates the fourth position of the unit 1 for dosing a confectionery mass. In this position, there is not yet a connection between the dosing chamber 26 and the outlet opening 16, but this connection is realized directly afterwards.

Figure 5:
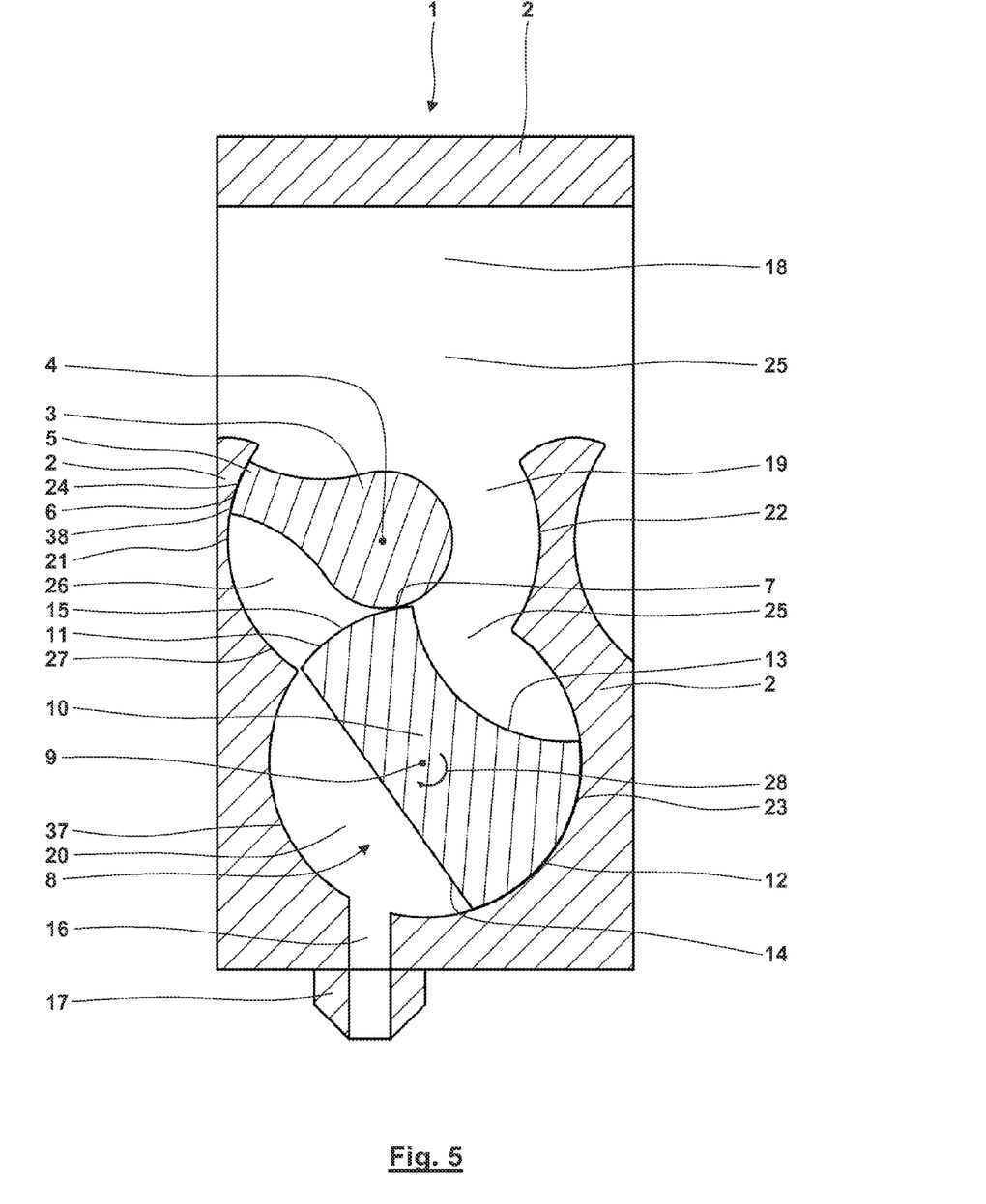
FIG. 5 is a view of the unit for dosing a confectionery mass in a following fifth position.

The position occurring soon afterwards is illustrated in FIG. 5. This is the fifth position in which the connection can now be seen. It can also be seen that the dosing chamber 26 and the outlet opening 16 are separated from the mass supply 25 in this position. In this way, it is prevented that confectionery mass exits from the unit 1 for dosing a confectionery mass before the actual dosing cycle.

Figure 6:
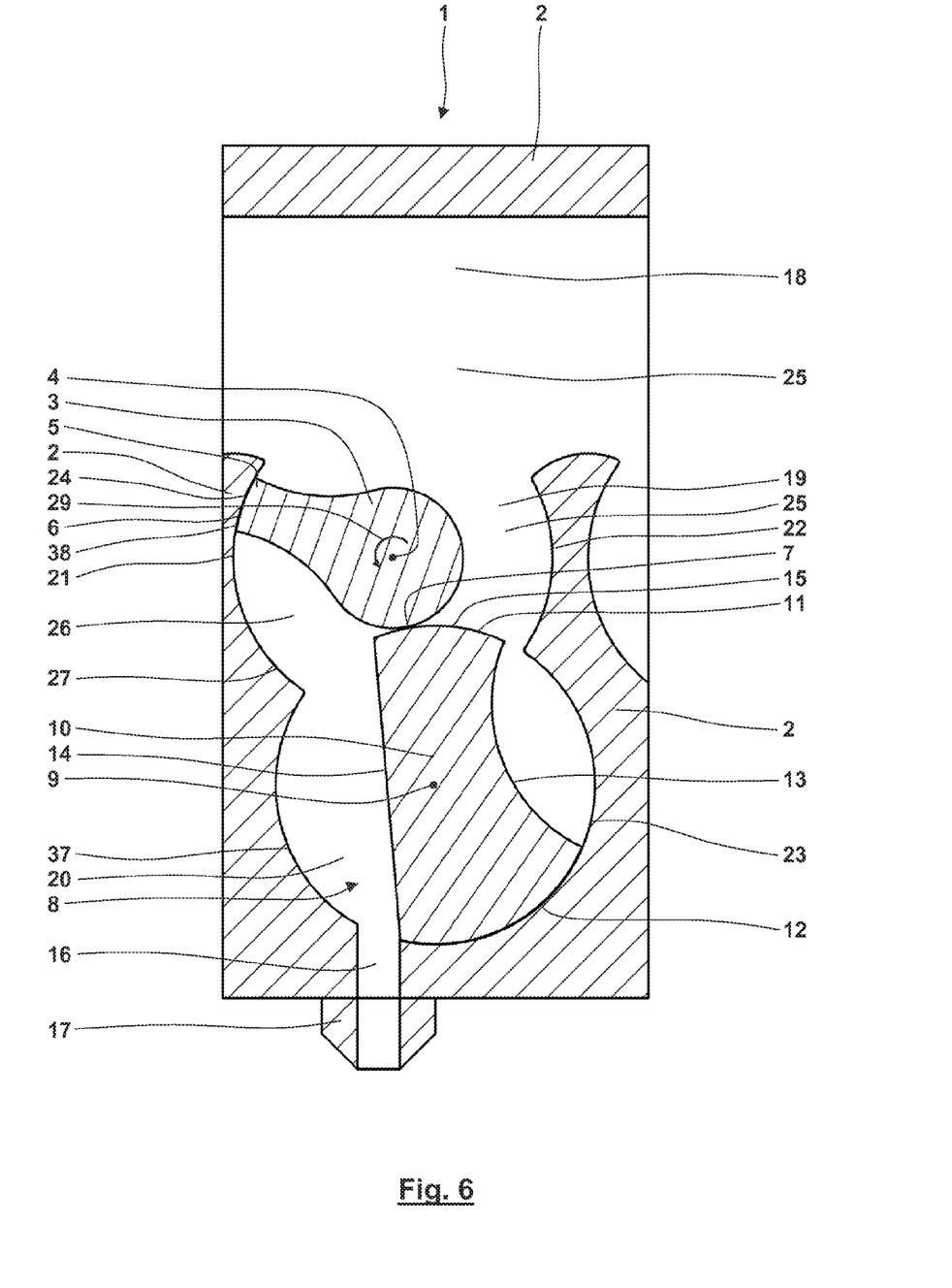
FIG. 6 is a view of the unit for dosing a confectionery mass in a following sixth position at the beginning of a removing cycle.

In the sixth position of the unit 1 for dosing a confectionery mass illustrated in FIG. 6, the closing part 10 is in its fully closed position. In this position, the rotational movement of the dosing part 10 in the first direction of rotation 28 ends. The rotary piston 3 as well as the closing part 10 thus stand still in this position. The actual removing cycle now begins. The rotary piston 3 is then rotatingly driven in the second direction of rotation 29. During this rotational movement in the second direction of rotation 29, the rotary piston 3 removes the confectionery mass from the dosing chamber 26. This part of the confectionery mass also pushes the confectionery mass following in a downward direction towards the outlet opening 16 further such that a volume of confectionery mass exits through the outlet opening 16, the volume corresponding to the volume of the dosing chamber 26. This means that the volume of the dosing chamber 26 and of the confectionery mass exiting the unit 1 for dosing a confectionery mass are identical, but the particles of the confectionery mass are not identical.

Figure 7:
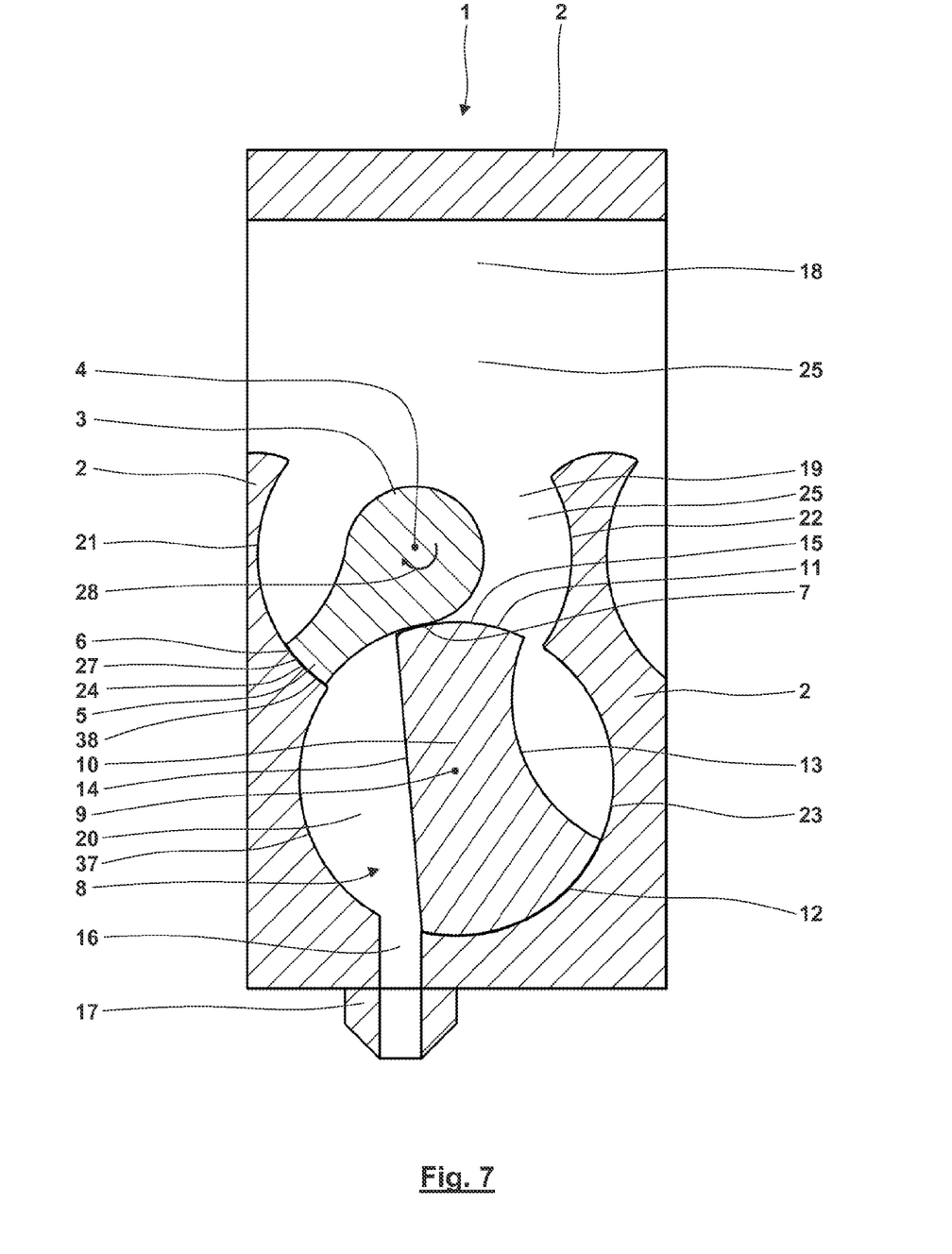
FIG. 7 is a view of the unit for dosing a confectionery mass in a following seventh position.

The end of the removing movement is illustrated in the seventh position of the unit 1 for dosing a confectionery mass illustrated in FIG. 7.

According to a first embodiment of the method, the closing part 10 is then rotated in the second direction of rotation 29 such that once again the first position illustrated in FIG. 1 is attained. One working cycle ends, and it is followed by the next working cycle.

Figure 8:
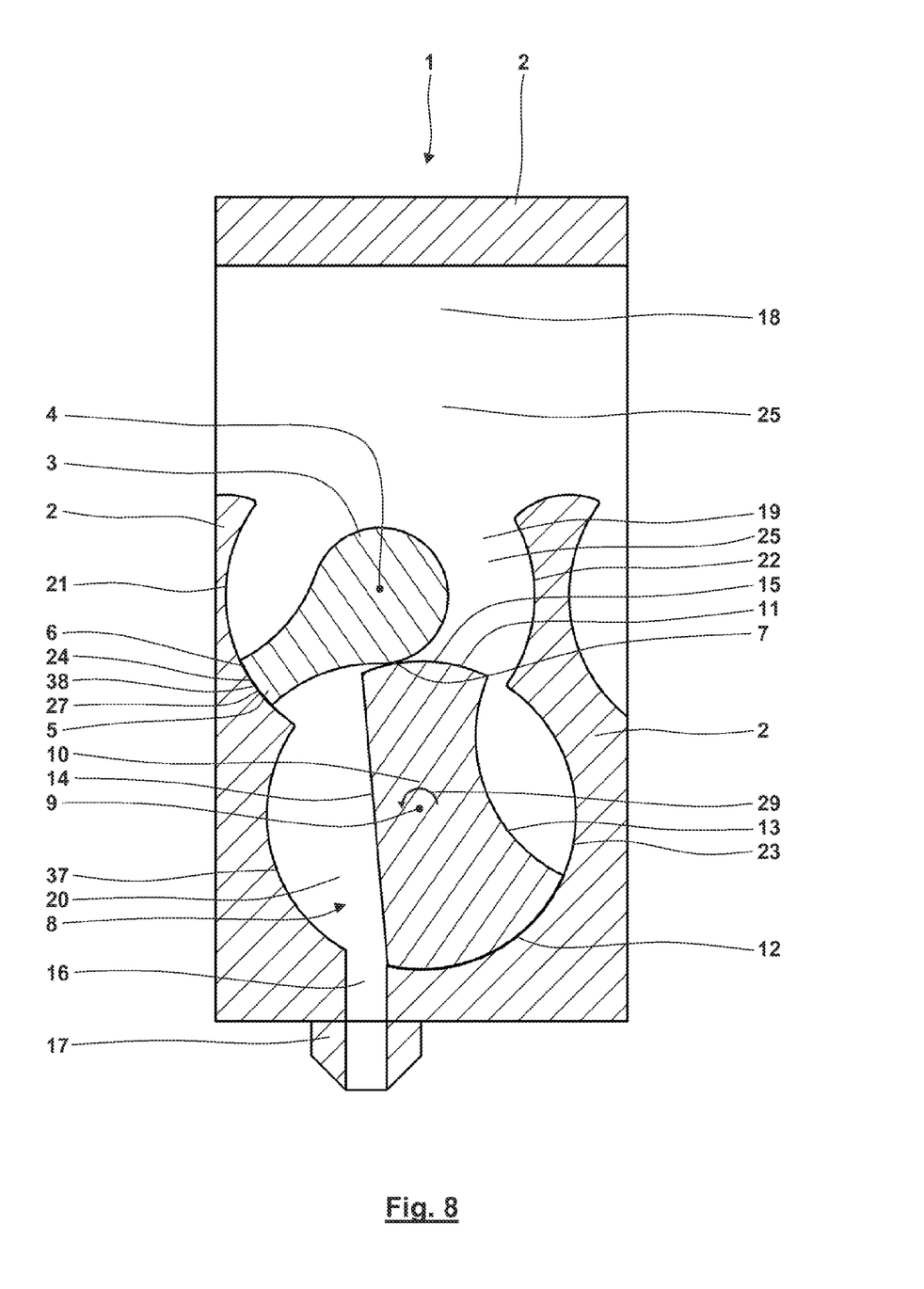
FIG. 8 is a view of the unit for dosing a confectionery mass in a following optional eighth position.

According to a second embodiment of the method, the rotary piston 3 can be moved backwards for a few angle degrees (approximately 2 to 20 angle degrees, especially approximately 5 to 15 angle degrees, especially approximately 9 to 12 angle degrees, for example) in the first direction of rotation 28 as this is the case in the eighth position illustrated in FIG. 8. In this way, the rotary piston 3 causes defined breaking of the thread of the confectionery mass such that the confectionery mass can be dosed in a clean way. Next, the closing part 10 is rotated in the second direction of rotation 29 until it has reached the position illustrated in FIG. 1. The rotary piston 3 however is located in a slightly different rotational position as in FIG. 1, namely the rotational position of FIG. 8. In this position, the working cycle is completed. The next working cycle begins, and the second position illustrated in FIG. 2 is attained.

Figure 9:
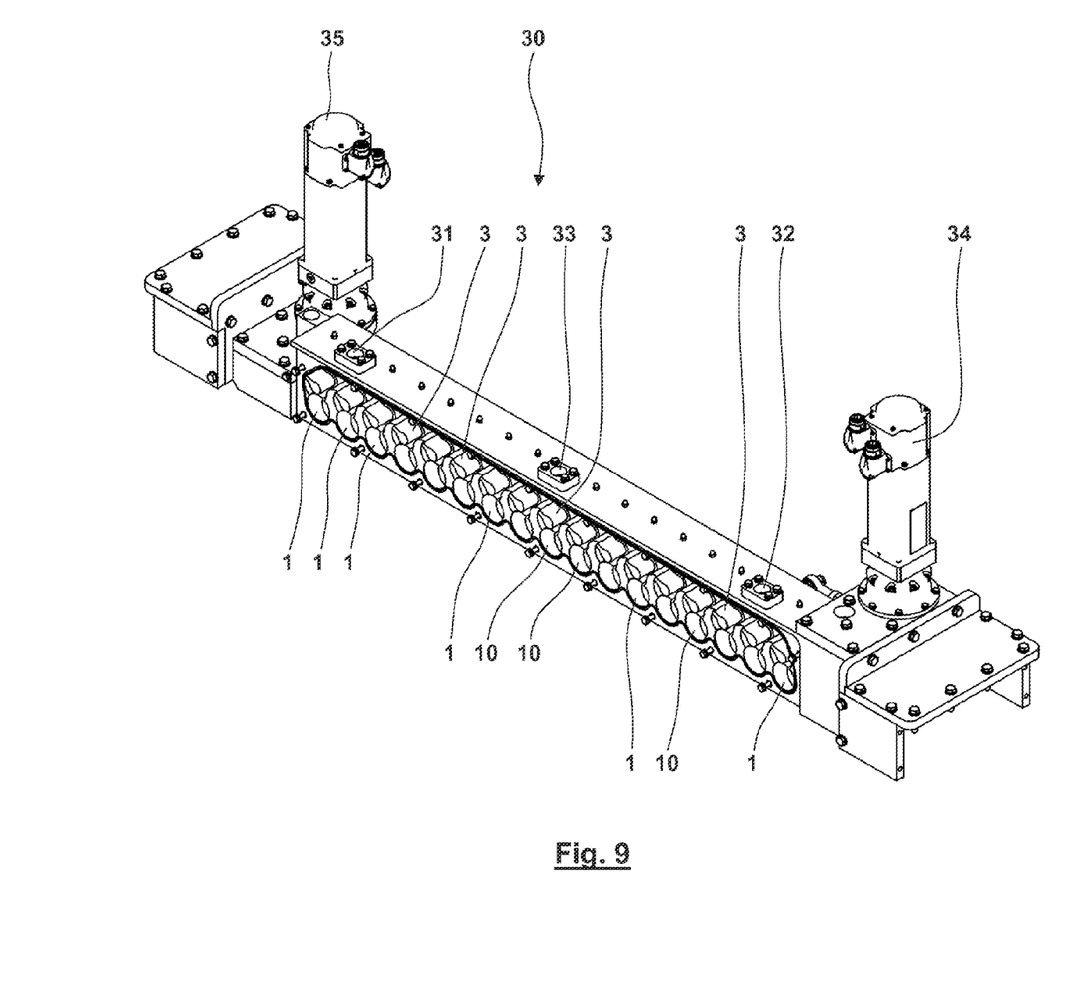
FIG. 9 is a perspective view of a first exemplary embodiment of a novel apparatus including a plurality of units for dosing a confectionery mass.
Figure 10:
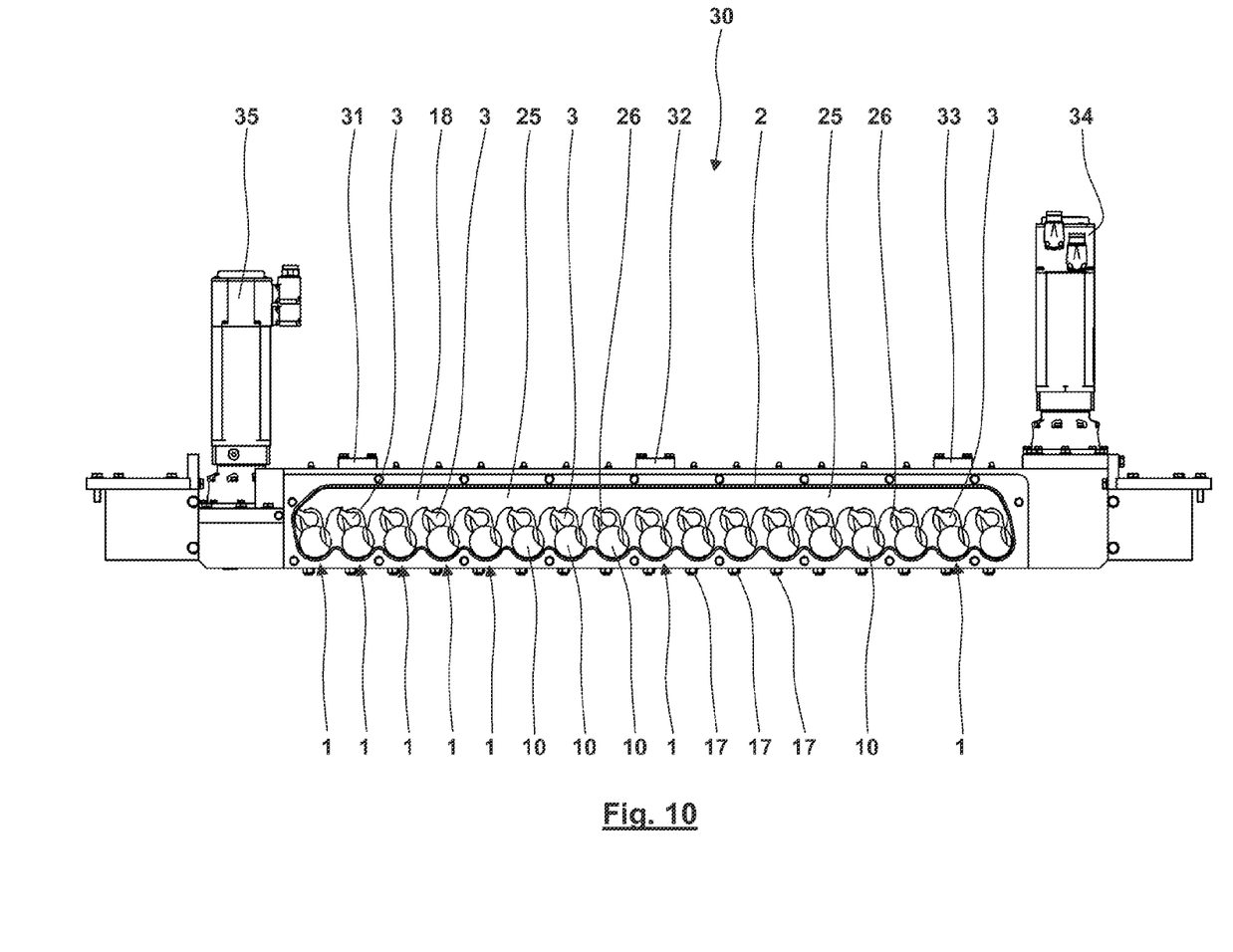
FIG. 10 is a front view of the apparatus according to FIG. 9.
Figure 11:
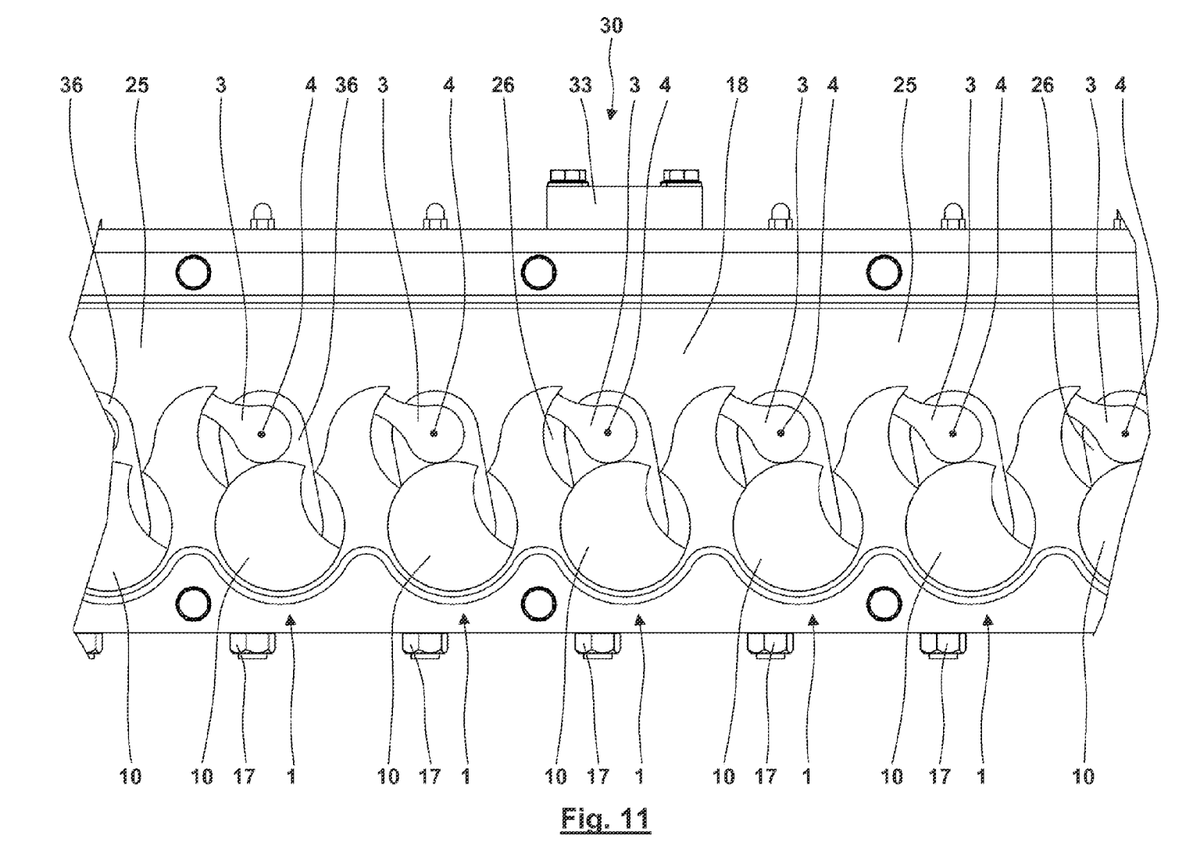
FIG. 11 is a detailed view of a part of the apparatus according to FIG. 10.

FIGS. 9 to 11 illustrate different views of an exemplary embodiment of an apparatus 30 including a plurality of units 1 for dosing a confectionery mass. The structure and the functionality of the units 1 for dosing a confectionery mass is the one described above such that it is referred to the statements above.

The apparatus 30 for dosing a confectionery mass in this case includes 17 units 1 for dosing a confectionery mass being located side by side. However, it is also possible to arrange less or more units 1 for dosing a confectionery mass. The units 1 for dosing a confectionery mass are located side by side such that the rotational axes 4 of their rotary pistons 3 extend parallel to each other in a spaced apart manner. For improving clarity of the drawings, not all units 1 for dosing a confectionery mass are designated with the reference numeral 1. In FIGS. 9 to 11, and not all of their components include reference numerals.

The apparatus 30 includes a first inlet connection 31, a second inlet connection 32 and an outlet connection 33. A flexible hose conduit (not illustrated) is connected to each of the connections 31, 32, 33. A confectionery mass is fed to the apparatus 30 via the hose conduits being connected to the inlet connections 31 and 32. Surplus confectionery mass is removed from the apparatus 30 via the flexible hose conduit being located in the center portion of the apparatus 30 and being connected to the outlet connection 33. This surplus confectionery mass is then re-fed into the apparatus 30—possibly after an intermediate treatment.

The apparatus 30 includes a first servomotor 34 and a second servomotor 35. The first servomotor 34 is part of a first drive (not illustrated in detail) having a common first drive shaft being connected to the rotary piston 3 such that they are commonly driven in the desired way.

The second servomotor 35 is part of a second drive (not illustrated in detail) including a common second drive shaft being connected to the closing parts 10 of the outlet valves 8 such that they are commonly driven in the desired way.

As it is especially to be seen in FIGS. 10 and 11, the units 1 for dosing a confectionery mass include a common base body 2 and a common housing, respectively. In this way, one common mass supply 25 is formed.

It is to be also seen in FIG. 11 that the rotary piston 3 and the closing part 10 are supported at a bearing block 36. In this way, replacing and repairing, respectively, the rotary piston 3 and the closing part 10 is simplified.

Many variations and modifications may be made to the preferred embodiments of the invention without departing substantially from the spirit and principles of the invention. All such modifications and variations are intended to be included herein within the scope of the present invention, as defined by the following claims.

We claim:

1. A unit for dosing a confectionery mass, comprising:
a base body;
a dosing chamber, the dosing chamber being arranged in the base body, the dosing chamber being designed and arranged to contain a confectionery mass;
a rotary piston,
the rotary piston being arranged in the base body,
the rotary piston being rotatingly driven with respect to the base body,
the rotary piston being designed and arranged to be reversingly driven to alternatingly fill the dosing chamber with confectionery mass and to remove confectionery mass from the dosing chamber,
the rotary piston having a filling cycle for filling the dosing chamber with confectionery mass, the rotary piston during the filling cycle being rotatingly driven in a first direction of rotation,
the rotary piston having a removing cycle for removing the confectionery mass from the dosing chamber, the rotary piston during the removing cycle being rotatingly driven in a second direction of rotation, the second direction of rotation being opposite to the first direction of rotation, and
the filling cycle and the removing cycle forming one complete working cycle of the rotary piston, the one complete working cycle consisting of the filing cycle and the removing cycle;
an outlet valve, the outlet valve including a closing part, the closing part being designed and arranged to be rotatingly driven with respect to the base body and the rotary piston to alternatingly reach a closed position and an opened position, the dosing chamber being defined by the base body, the rotary piston, and the closing part; and
an outlet opening, the outlet opening being designed and arranged to discharge the confectionery mass from the unit, the outlet opening in the closed position of the closing part not being connected to the dosing chamber, the outlet opening in the opened position of the closing part being connected to the dosing chamber.

2. The unit of claim 1, further comprising a mass supply, the mass supply being designed and arranged to feed confectionery mass to the dosing chamber.

3. The unit of claim 2, wherein the rotary piston and the closing part are designed and arranged such that the dosing chamber and the outlet opening are not connected to the mass supply in the opened position of the closing part and during the beginning of the rotation of the closing part from the closed position into the opened position.

4. The unit of claim 2, wherein a first part of the mass supply is limited by the base body, the rotary piston and the closing part and this first part of the mass supply is arranged at the other side of the rotary piston compared to the dosing chamber.

5. The unit of claim 3, wherein a first part of the mass supply is limited by the base body, the rotary piston and the closing part and this first part of the mass supply is arranged at the other side of the rotary piston compared to the dosing chamber.

6. The unit of claim 2, wherein the closing part includes a first sealing member, the first sealing member being designed and arranged to separate the dosing chamber and the outlet opening from the mass supply, the first sealing member being formed by a surface of the closing part, the surface having the shape of a part of an circular arc as seen in cross section.

7. The unit of claim 3, wherein the closing part includes a first sealing member, the first sealing member being designed and arranged to separate the dosing chamber and the outlet opening from the mass supply, the first sealing member being formed by a surface of the closing part, the surface having the shape of a part of an circular arc as seen in cross section.

8. The unit of claim 6, wherein
the base body includes a second sealing member, the second sealing member defining a second sealing portion and being designed and arranged to limit the dosing chamber and to seal the dosing chamber with respect to the mass supply; and
the rotary piston includes a third sealing member, the third sealing member being designed and arranged to seal the dosing chamber with respect to the mass supply, the third sealing member corresponding to the second sealing member, the rotary piston during normal operation of the unit only being moved within the second sealing portion of the base body.

9. The unit of claim 7, wherein
the base body includes a second sealing member, the second sealing member defining a second sealing portion and being designed and arranged to limit the dosing chamber and to seal the dosing chamber with respect to the mass supply; and
the rotary piston includes a third sealing member, the third sealing member being designed and arranged to seal the dosing chamber with respect to the mass supply, the third sealing member corresponding to the second sealing member, the rotary piston during normal operation of the unit only being moved within the second sealing portion of the base body.

10. The unit of claim 1, wherein the rotary piston is rotatingly driven at two different rotational velocities during the removing cycle.

11. The unit of claim 1, further comprising a servomotor being designed and arranged to drive the rotary piston.

12. The unit of claim 2, wherein the confectionery mass is fed into the mass supply with a positive pressure.

13. The unit of claim 12, wherein the positive pressure is more than 1 bar.

14. An apparatus for dosing a confectionery mass, comprising
a plurality of units of claim 1 for dosing a confectionery mass, the units being arranged side by side.

15. The apparatus of claim 14, wherein each of the rotary pistons of each of the plurality of units has a rotational axis, the rotational axes of the units being arranged to be parallel to each other and to be spaced apart from one another.

16. The apparatus of claim 15, further comprising a flexible hose connection, flexible hose connection being designed and arranged to feed confectionery mass to the units.

* * * * *